(12) United States Patent
Posselius et al.

(10) Patent No.: US 9,173,347 B2
(45) Date of Patent: Nov. 3, 2015

(54) BALERS AND METHODS FOR FORMING HIGH DENSITY BALES

(75) Inventors: John Henry Posselius, Ephrata, PA (US); Christopher A. Foster, Denver, PA (US); Edward H. Priepke, Lancaster, PA (US); Kevin M. Smith, Narvon, PA (US); Scott Allen Shearer, Nicholasville, KY (US); Michael David Montross, Lexington, KY (US); William C. Adams, Waddy, KY (US)

(73) Assignee: CNH Industrial America LLC, New Holland, PA (US)

( * ) Notice: Subject to any disclaimer, the term of this patent is extended or adjusted under 35 U.S.C. 154(b) by 591 days.

(21) Appl. No.: 13/175,285

(22) Filed: Jul. 1, 2011

(65) Prior Publication Data

US 2013/0000497 A1 Jan. 3, 2013

(51) Int. Cl.
*A01F 15/10* (2006.01)
*A01F 15/08* (2006.01)
*A01F 15/07* (2006.01)

(52) U.S. Cl.
CPC .............. *A01F 15/0825* (2013.01); *A01F 15/07* (2013.01); *A01F 15/08* (2013.01); *A01F 15/10* (2013.01)

(58) Field of Classification Search
CPC ......... A01F 15/08; A01F 15/07; A01F 15/00; A01F 15/10; A01F 15/0825
USPC ...... 100/3, 7, 35, 94, 96, 98 R, 70 A, 88, 169, 100/176, 188 R, 39, 142, 189; 56/131, 192, 56/341
See application file for complete search history.

(56) References Cited

U.S. PATENT DOCUMENTS

| | | | |
|---|---|---|---|
| 2,469,580 A | 3/1944 | Scranton | |
| 4,446,678 A | 5/1984 | Smith | |
| 4,510,741 A * | 4/1985 | Campbell et al. | 56/341 |
| 4,619,106 A * | 10/1986 | van der Lely | 56/341 |
| 4,803,832 A * | 2/1989 | Crawford | 56/341 |
| 4,912,914 A | 4/1990 | Wingard | |
| 5,052,170 A | 10/1991 | Trenkamp et al. | |
| 5,419,106 A | 5/1995 | Gemelli | |
| 5,630,313 A * | 5/1997 | Von Allworden et al. | 56/16.4 B |
| 6,032,446 A | 3/2000 | Gola et al. | |
| 6,601,375 B1 | 8/2003 | Grahl et al. | |
| 6,655,121 B1 * | 12/2003 | Viesselmann et al. | 56/341 |
| 6,711,996 B1 * | 3/2004 | Mackie | 100/169 |

(Continued)

FOREIGN PATENT DOCUMENTS

| | | |
|---|---|---|
| AP | EP0995352 A1 | 10/1999 |
| DE | 4344585 | 6/1995 |

(Continued)

*Primary Examiner* — Jimmy T Nguyen
(74) *Attorney, Agent, or Firm* — Patrick M. Sheldrake; Seyed V.; Sharifi T.

(57) ABSTRACT

An improved baler and a method of using the improved baler to produce high density bales. The baler comprises a pick-up assembly configured to pick-up crop material; a compression assembly comprising at least one pair of opposing compression rollers configured to generate a pressure on the crop material sufficient to crush the nodes as it passes between the compression rollers; and a bale chamber, wherein the crushed crop forms a bale. The compression rollers define an adjustable gap therebetween. By adjusting the gap, a pressure sufficient to crush the nodes of the crop may be exerted on the crop material as it passes between the compression rollers may be controlled, resulting in bales of higher density than conventional bales.

18 Claims, 10 Drawing Sheets

(56) References Cited

U.S. PATENT DOCUMENTS

| | | | |
|---|---|---|---|
| 7,520,214 B2 * | 4/2009 | Dehondt | 100/3 |
| RE40,761 E | 6/2009 | Truitt | |
| 7,743,595 B2 | 6/2010 | Savoie et al. | |
| 8,820,040 B2 * | 9/2014 | Posselius et al. | 56/341 |

FOREIGN PATENT DOCUMENTS

| | | | |
|---|---|---|---|
| DE | 19539143 A1 * | 4/1997 | |
| EP | 0467283 A2 | 7/1991 | |
| FR | 1239827A A | 11/1959 | |
| JP | 403117426 | 5/1991 | |

* cited by examiner

BALERS AND METHODS FOR FORMING HIGH DENSITY BALES

TECHNOLOGY FIELD

The present disclosure relates generally to improved balers and methods for forming high density bales of crop materials, for example, miscanthus, switchgrass, small grain straws, corn cobs, or stover.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, a pick-up assembly of the baler gathers the cut and windrowed crop material from the ground then conveys the cut crop material into a bale-forming chamber (or bale chamber) within the baler. A drive mechanism operates to activate the pick-up assembly, augers, and a rotor of the feed mechanism. A conventional bale chamber may include of a pair of opposing sidewalls with a series of belts, chains, and/or rolls that rotate and compress the crop material into a cylindrical shaped bale. Square balers operate on similar principles but form "slices" which when stacked together form a rectangular or "square" bale.

Certain dry crop materials, such as miscanthus, switchgrass, small grain straws, or a mix of corn cobs and stover have a relatively low bulk density in traditional bales, either round or square. Densities can range from 7 to 14 pound/square feet. To be able to take advantage of trucking capacities, the U.S. Department of Energy has targeted 15.5 pound/square feet as a goal to improve transportation and logistic costs. Moreover, crop materials with stems having nodes and/or internodes also have a relatively low bulk density in round or square traditional bales.

Current round balers today rely on belt tension to regulate the bale density. However, as belt tension increases, the durability of the belt and rolls decreases. Thus, further increasing belt tension does not serve as a good option to increase bale density. Relatedly, it is also desirable to improve current square balers today to form high density bales.

High density bales are desirable because they would allow people to take advantage of transportation capacities and will reduce the numbers of the bales to work with. The present invention is directed to these and other important ends.

SUMMARY

Embodiments of the present invention provides improved balers and methods for forming high density bales. In some embodiments, the present disclosure provides a baler comprising a pick-up assembly; a compression assembly comprising at least one pair of opposing compression rollers configured to generate a pressure on crop material passed therethrough, the at least one pair of opposing compression rollers defining an adjustable gap therebetween, the compression assembly being configured to crush the crop material passed therethrough; and a bale chamber, wherein the crushed crop forms a bale.

According to one embodiment of the invention, to crush comprises destroying the structural integrity of an individual stem of crop material so that the individual stem may not spring back. According to another aspect of one embodiment of the invention, to crush further comprises flattening a majority of one or more nodes or internodes so that the nodes or internodes do not spring back, wherein the nodes and internodes are located along the stems of the crop material. According to another aspect of one embodiment of the invention, the majority is a number of nodes or internodes greater than about seventy percent of the nodes and internodes in the crop material.

According to one embodiment of the invention, the opposing compression rollers are configured to generate a pressure on the crop material greater than about fifty pound/linear square inch. According to one embodiment of the invention, the opposing compression rollers are configured to generate a pressure on the crop material based on the type of crop material being crushed. According to another aspect of one embodiment of the invention, the crop material comprises at least one of: miscanthus, switchgrass, small grain straws, corn cobs, or stover. According to one embodiment of the invention, the opposing compression rollers are configured to generate a pressure on the crop material based on the amount of crop material being crushed.

According to one embodiment of the invention, the pressure may vary as the crop material passes therethrough the at least one pair of opposing compression rollers.

According to one embodiment of the invention, the compression rollers comprise a saw tooth pattern to improve passage of the crop mater through the baler in addition to crushing the crop material passed therethrough the at least one pair of opposing compression rollers.

In some embodiments, the present disclosure provides a method for crushing a crop material to form a high density bale. The method comprises picking up crop material by a pick-up assembly; crushing the crop material by a compression assembly, wherein the compression assembly comprising at least one pair of opposing compression rollers configured to generate a pressure on crop material passed therethrough, the at least one pair of opposing compression rollers defining an adjustable gap therebetween, the compression assembly being configured to crush the crop material passed therethrough; and baling the crushed material by a bale chamber to form a bale.

According to one embodiment of the invention, crushing comprises destroying the structural integrity of an individual stem of crop material so that the individual stem may not spring back. According to another aspect of one embodiment of the invention, crushing further comprises flattening a majority of nodes or internodes so that the nodes or internodes do not spring back and wherein the nodes and internodes are located along the stems of the crop material.

According to one embodiment of the invention, the method further includes configuring the at least one pair of opposing compression rollers to generate a pressure greater than about fifty pound/linear square inch on the crop material.

According to one embodiment of the invention, the method further includes adjusting, by a controller, the gap between the at least one pair of opposing compression rollers of the compression assembly to vary the pressure generated by the at least one pair of opposing compression rollers on the crop material passed therethrough. According to another aspect of one embodiment of the invention, the method further comprises adjusting the gap to vary the pressure based on the type of crop material being crushed. According to another aspect of one embodiment of the invention, the method further includes adjusting the gap to vary the pressure based on the amount of crop material being crushed.

According to one embodiment of the invention, the method further includes feeding the crop material with a saw tooth on the compression rollers to improve passage of the crop material through the baler in addition to crushing the crop material passed therethrough.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

In some embodiments, the present invention provides an improved baler for forming high density bales of crop materials, for example, those having a relatively low bulk density in traditional bales (such as miscanthus, switchgrass, small grain straws, corn cobs, stover) or those having stems that includes nodes and internodes. The baler of the present invention can be either for square bales or round bales.

Figure 1:
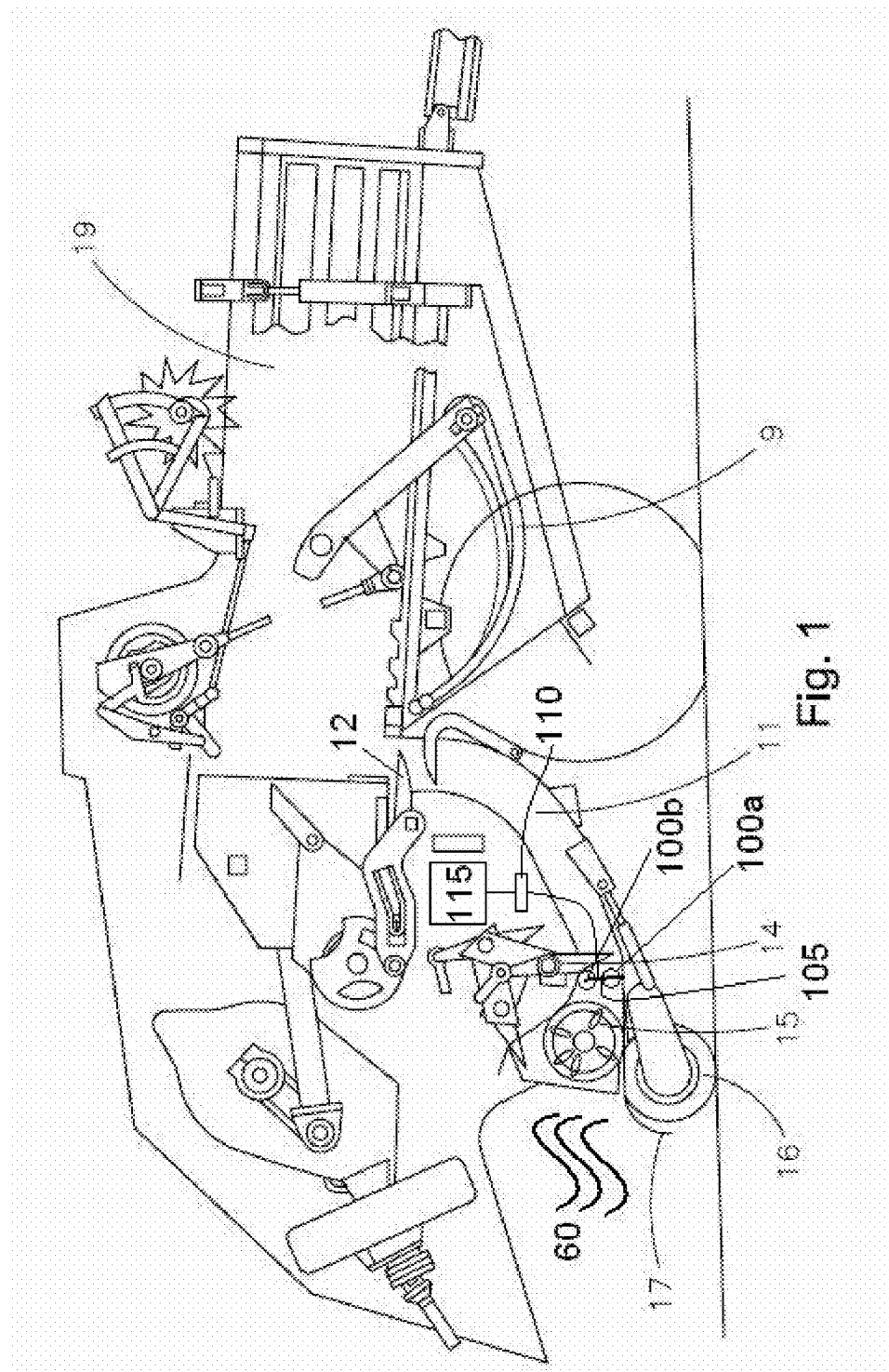
FIG. 1 illustrates a cutaway side elevational view of an exemplary square baler according to an embodiment.

FIG. 1 illustrates an exemplary square baler according to an embodiment of the present invention. When baling a crop material (such as hay) in a square bale, a baler (or baling apparatus) may be outfitted with a pre-chamber 11 that forms a slice of bale material. The pre-formed slice may be injected into the main bale chamber where a bale is formed.

As shown in FIG. 1, the pre-chamber 11 of the square baler may be positioned between a pick-up assembly and a bale chamber 19. The pick-up assembly may include pick-up tines 16, optional baffle plates 17, and one or more centering augers 15. The pick-up tines 16, baffle plates 17 and centering augers 15 may work in concert to pick up crop material 60 and align it for conveyance toward the pre-chamber 11. From the pick-up assembly, the crop material 60 may pass through a gap between one pair of opposing compression rollers, the pair including a lower roller 100a and an upper roller 100b. Depending on the mounting and arrangement of the lower roller 100a and the upper roller 100b, the gap between the two rollers may be adjustable. In some embodiments, one compression roller of the pair of opposing compression rollers (for example, the lower roller 100a) is fixed to a frame of the baler, and the other compression roller of the pair of opposing compression rollers (for example, the upper roller 100b) is floating (e.g., adjustably supported on the baler frame). In some embodiments, each of the compression rollers of the pair of opposing compression rollers is floating (adjustably supported on the baler frame).

The lower roller 100a and the upper roller 100b may be linked together, for example, by a hydraulic cylinder 105, a spring, or the like, to generate a pre-defined pressure on the crop material 60 passing therethrough. By applying the pressure to the crop material 60, the lower roller 100a and the upper roller 100b may act to crush the crop material. In some embodiments, a hydraulic cylinder (such as the hydraulic cylinder 105 in FIG. 1) may be used to provide a reading of the pressure generated by the pair of opposing compression rollers on the crop material 60 passed therethrough. The lower roller 100a and the upper roller 100b may be driven by a motor to rotate towards one another so that the crop material 60 may be fed into the gap between the pair of rollers and may be crushed by the pair of the roller as the rollers rotate.

As used herein, to crush a crop material refers to decreasing/destroying the structural integrity of the each individual stem of the crop material so that it does not spring back. In some embodiments, a stem of a crop material has one or more nodes and/or internodes. In such embodiments, crushing the crop material includes crushing the majority (for example, greater than about 70%, 75%, 80%, 85%, 90%, 95%, 98%, or 99%) of the nodes and/or internodes (the crushed nodes and/or internodes are flattened and will not spring back).

The pre-defined pressure generated by the pair of opposing compression rollers to crush crop material passed therethrough depends on the nature of the crop material. In some embodiments, the predefined pressure generated by the lower roller 100a and the upper roller 100b to crush crop material passed therethrough is greater than about 50 pound/linear square inch, about 60 pound/linear square inch, about 70 pound/linear square inch, about 80 pound/linear square inch, about 90 pound/linear square inch, or about 100 pound/linear square inch.

It should be noted that the pressures described herein are shown by way of example only. Additional pressures may be used during operation of the compression rollers. For example, if a mat of crop material is passed between the compression rollers, a force of about 400 pounds/linear square inch may be applied to the compression rollers to crush a high percentage of the crop nodes. Various pressures may be determined based upon the type of crop being crushed as well as the amount of crop material being crushed simultaneously and may vary during the operation of the compression rollers.

To maintain the pre-defined pressure generated by the lower roller 100a and the upper roller 100b on the crop material 60 passed therethrough, the gap between the lower roller and the upper roller may be adjusted, depending, for example, on the nature and thickness of the crop material that is to pass through the gap (e.g., the thickness of the crop matt). In some embodiments, there may be a pressure sensor 110 that detects the pressure generated by the pair of opposing compression rollers on the crop material passed therethrough; and the gap between the pair of opposing compression rollers of the compression assembly is adjustable/adjusted to maintain the pre-defined pressure generated by the pair of opposing compression rollers on the crop material passed therethrough. In some further embodiments, a controller 115 may be coupled to the pressure sensor 110, and adjustment of the gap between a pair of opposing compression rollers is automatically controlled by the controller. In other further embodiments, adjustment of the gap between the pair of opposing compression rollers is manually controlled by an operator of the baler.

Because of the high pressure generated by the lower roller 100a and the upper roller 100b, it is preferable that the lower roller and the upper roller do not touch at any given time when in operation. For example, the gap between the lower roller 100a and the upper roller 100b may have a minimum value or threshold that is always maintained. For example, the minimum value or threshold may be about 1.0 cm, about 1.2 cm, 1.3 cm, 1.4 cm, 1.5 cm, or about 2 cm.

It should be noted the gaps discussed above are shown by way of example only. The actual gap between the compression roller during operation may vary accordingly based upon a number of factors, including but not limited to, amount of crop being crushed simultaneously, forward speed of the baler, type of crop being crushed, and other similar factors.

It may be advantageous to localize reduction of structural integrity (crushing) of crop materials at the gap between the lower roller 100a and the upper roller 100b. The localization of crushing the crop material will reduce equipment requirements for other parts of the baler such as the bale chamber where bales are formed, for example, by a plunger. For example, by locally crushing the crop material, a denser crop material is fed to the bale chamber. The size and associated crushing/stacking force required for the baler forming device may be lowered as the crop material is already crushed. This may also reduce any hydraulic requirements associated with the bale chamber as the force asserted on the crop material is reduced as a result of the crop material being crushed locally at the compression rollers.

Figure 10:
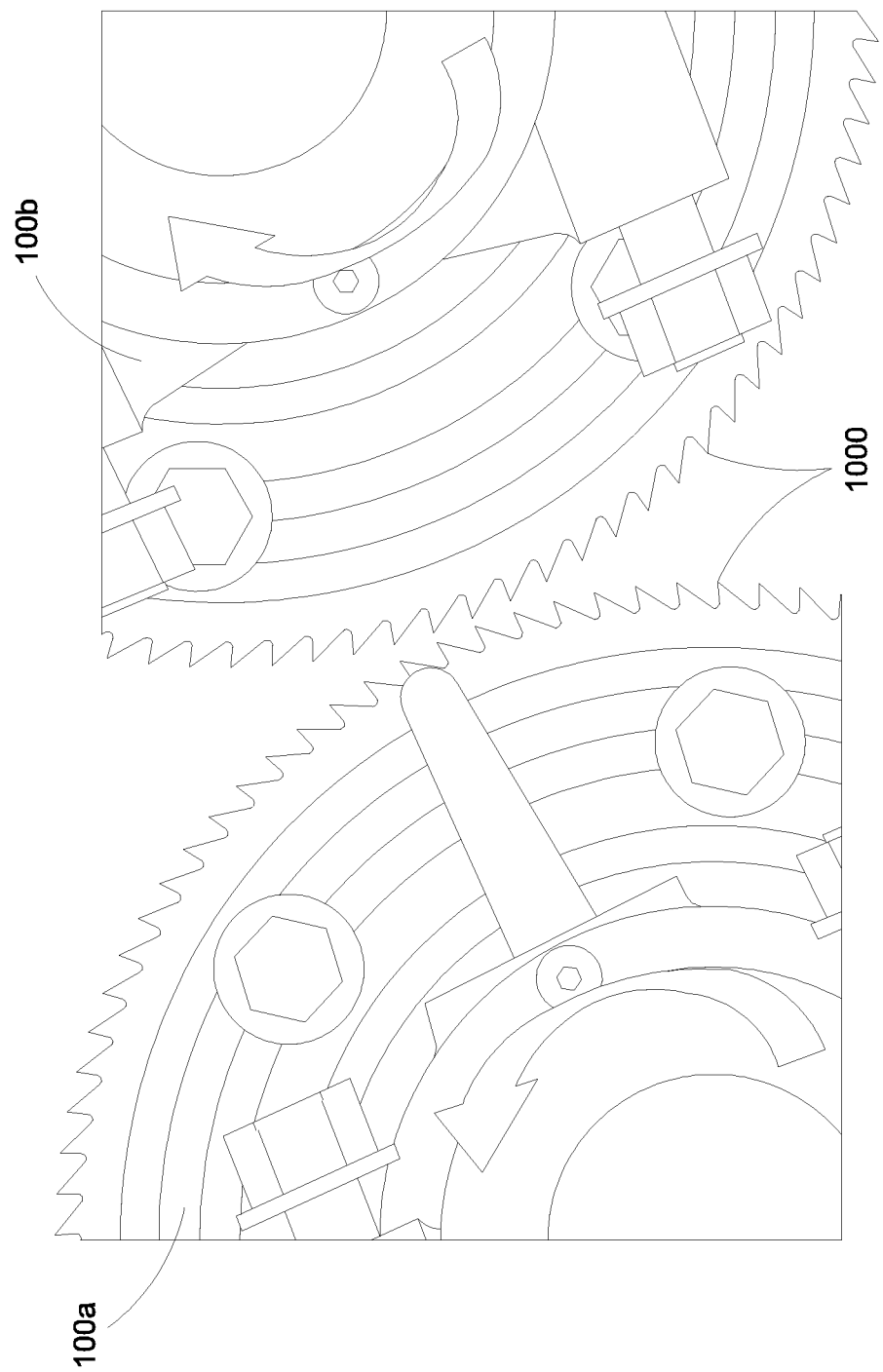
FIG. 10 illustrates an exemplary saw tooth pattern on compression rollers according to an embodiment.

Those skilled in the art would be able to select suitable rollers for the compression rollers that crush the crop materials (i.e., the lower roller 100a and the upper roller 100b). Based upon the application and intended use, the material and/or surface design of the rollers can be used as parameters for selection of rollers. For example, a metal roller (such as steel or stainless steel roller) is suitable to meet the high pressure requirement needed to crush the nodes of certain crop materials. For another example, a spiral roller or a high contact roller can be suitable because the small surface features of the spiral roller or the high contact roller can provide crop traction and the large flat surfaces can be suitable to crush the crop at high pressures. For yet another example, and as shown in FIG. 10, a roller or rollers with a saw tooth pattern 1000 can be used to improve crop material feeding in addition to crushing crop materials. The saw tooth pattern 1000 shown is on both the lower roller 100a and upper roller 100b. The selection of suitable rollers also depends, in part, on the crop materials to be crushed.

Referring again to FIG. 1, the speed of the lower roller 100a and the upper roller 100b may be synchronized with the other parts of the baler. For example, the pick-up assembly and the bale chamber 19 may be synchronized with the lower roller 100a and the upper roller 100b. In this regard, the capacity of the lower roller 100a and the upper roller 100b matches the capacity of the pick-up assembly and the capacity of the bale chamber 19, and thus the entire baler operates efficiently with a minimized risk of overcollection/clogging.

In some embodiments, the thickness of the crop material that is to pass through the lower roller 100a and the upper roller 100b may be determined by factors such as the speed of the pick-up assembly and the distance between the pick-up assembly and the pair of opposing compression rollers. In some embodiments, an optional series of packer forks; an optional rotary feeder mechanism; or a pair of rotary feeder and cutter can be employed, for example, to control the thickness of the crop material that is to pass through the pair of opposing compression rollers.

Figure 2:
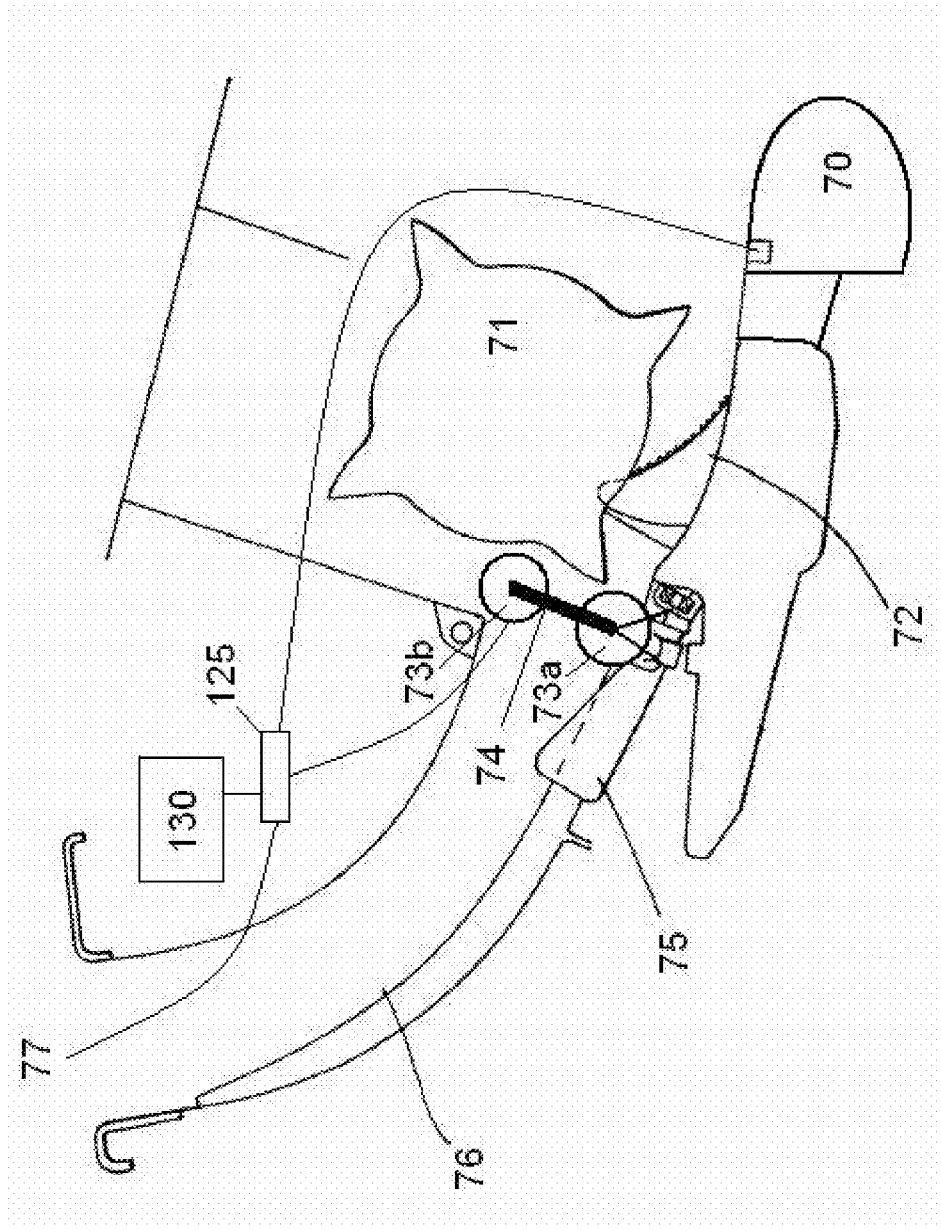
FIG. 2 illustrates a side view of a pick-up assembly, a pair of rotor and cutter, a pair of opposing compression roller, pre-chamber, a bale chamber of an exemplary square baler of the present invention.

Examples of packer forks and rotary feeder mechanism are described in U.S. Pat. No. 6,546,705, the disclosure of which is hereby incorporated by reference in its entirety. As shown in FIG. 2, a crop material (not shown) may be picked up via a pick-up assembly 70 and may pass a rotary feeder 71 and a cutter 72. From here, the crop material may pass through a gap between a lower fixed roller 73a and an upper floating roller 73b. As before, the lower fixed roller 73a and upper floating roller 73b may be configured and arranged such that they generate a pre-determined pressure to crush the crop materials passed therethrough. The crushed material then passes a material sensor or "hay dog" 75 into the pre-chamber 76 and then to bale chamber 77 where bales are formed.

In some embodiments, the baler further comprises a speed sensor 125 or a group of speed sensors. The speed sensor(s) 125 may be configured to detect the speeds of the pick-up assembly, the pair of opposing compression rollers (e.g., lower roller 100a and upper roller 100b), and the bale chamber 77. In some further embodiments, the baler may comprise a controller 130 or a group of the controllers coupled to the speed sensor(s) 125, wherein the synchronization of the pick-up assembly 70, the pair of opposing compression rollers 73a and 73b, and the bale chamber 77 may be automatically controlled by the controller. In some embodiments, the synchronization of the pick-up assembly 70, the pair of opposing compression rollers 73a and 73b, and the bale chamber 77 may be manually controlled by an operator of the baler.

Referring again to FIG. 1, after the crop material 60 is crushed by the lower roller 100a and the upper roller 100b, the crop material may pass an optional element 14, which may be forks or a rotor fork, configured and positioned to convey the crushed crop material into the pre-chamber 11 where it is partially compressed. The pre-chamber 11 may be used to establish how much crushed crop material 60 is in each slice. A baler operator may regulate the amount of material in one slice by varying parameters associated with the pre-chamber 11. Once that amount is reached, the material in the pre-chamber 11 may be injected into the bale chamber 19 by a crop holding finger, stuffer fork, and/or arm 12.

Once a slice is formed and ejected from the pre-chamber 11, a plunger, which may be continually driving like a piston in an engine, compresses the bale, forcing a slice, in FIG. 1 from left to right in the bale chamber 19. In this manner, slices are pushed to the right, as shown in FIG. 1, and compressed while forming the bale.

Square balers are well known in the agricultural industry, and the pick-assembly, pre-chamber, and bale chamber of any of such machines can be used in the square baler of the present invention. Examples of square balers can be found in U.S. application Ser. No. 12/871,439, filed Aug. 30, 2010 and entitled "Method of Tagging Square Bales," the content of which is hereby incorporated by reference in its entirety.

Figure 3:
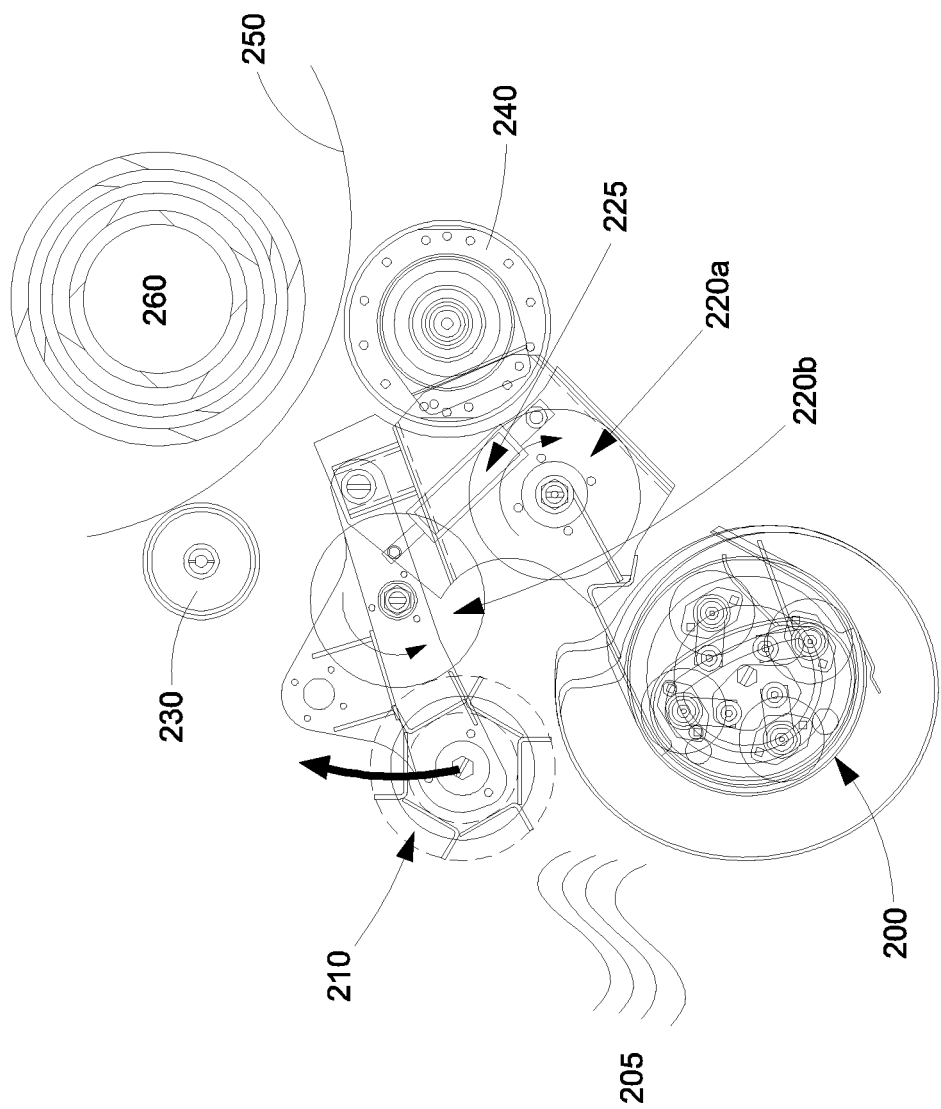
FIG. 3 shows a side view of an exemplary round baler of the present invention.

FIG. 3 shows an embodiment of the present invention including an exemplary round baler. As shown in FIG. 3, a pick-up assembly 200 may pick up crop material 205. From here, an optional feeder roller 210 may feed the crop material 205 through a gap between a pair of opposing compression rollers, specifically roller 220a and roller 220b, which are configured and positioned to generate a pre-defined pressure on the crop material passed therethrough to crush the crop material. The roller 220a and the roller 220b may be similar in construction to the lower roller 100a and the upper roller 100b as shown in FIG. 1. The roller 220a and the roller 220b may be linked together, for example, by a hydraulic cylinder (such as hydraulic cylinder 225), a spring, or the like. The hydraulic cylinder 225 may be configured to generate a pre-defined pressure on the crop material 205 passed through the rollers 220a and 220b to crush the crop material. The gap between the rollers 220a and 220b may be adjustable. In some embodiments, either roller 220a or roller 220b may be fixed to a frame of the baler while the other roller is floating (e.g., adjustably supported on the baler frame). In some embodiments, each of the rollers 220a and 220b may be floating (e.g., adjustably supported on the baler frame).

The pre-defined pressure generated by the rollers 220a and 220b to crush the crop material 205 passed therethrough may depend on the nature of the crop material. In some embodiments, the predefined pressure generated by the rollers 220a and 220b to crush the crop material 205 passed therethrough is greater than about 50 pound/linear square inch, about 60 pound/linear square inch, about 70 pound/linear square inch, about 80 pound/linear square inch, about 90 pound/linear square inch, or about 100 pound/linear square inch. A sensor and/or a controller (e.g., pressure sensor 110 and controller 115 as shown in FIG. 1) may be employed to sense and/or control the gap between roller 220a and roller 220b and/or the pressure generated by roller 220a and roller 220b on crop materials 205 passed therethrough.

The crop material 205 crushed by roller 220a and roller 220b may then pass to starter roller 230 and floor roller 240, and a bale chamber 250 where a round bale 260 is formed.

The speed of the pair of opposing rollers 220a and 220b may be synchronized with the other parts of the baler (e.g., the pick-up assembly and the bale chamber). In this regard, the capacity of the pair of opposing rollers 220a and 220b may match the capacity of the pick-up assembly 200 and the capacity of the bale chamber 250, and thus the entire baler operates without major congestion or clogging of crop material. One or more sensors and/or a controller (e.g., speed sensor 125 and controller 130 as shown in FIG. 2) may be employed to detect and control the speed of the pick-up assembly 200, the pair of opposing rollers 220a and 220b, and the bale chamber 250.

Round balers are well known in the agricultural industry, and the pick-assembly and bale chamber of any of such machines can be used in the round baler of the present invention. Examples of round balers can be found in U.S. Pat. Nos. 7,437,866, 6,877,304; 6,688,092; 6,644,006 and 6,295,797, the content of each of which is hereby incorporated by reference in its entirety.

The balers of the present invention may be configured to form high density bales. Comparing to a prior art baler (or a conventional baler), a baler of the present invention can improve the density of a baler by at least about 15%, 30%, 50%, 80%, 100%, 150%, or 200%.

Figure 4:
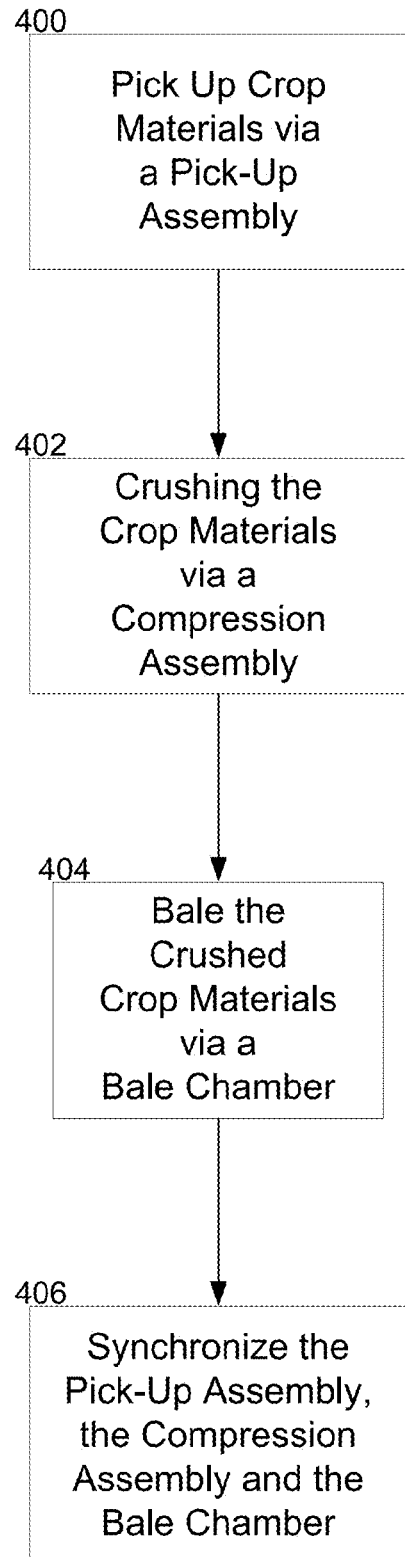
FIG. 4 illustrates an exemplary process for forming high-density bales according to an embodiment.

FIG. 4 illustrates an exemplary process for forming a high density bale according to an embodiment of the present invention. Initially, crop materials are picked up 400 by a pick-up assembly (e.g., pick-up assembly 200 as shown in FIG. 3). Once picked up 400, the crop materials may be crushed 402 via a compression assembly. Exemplary compression assemblies are discussed above in regard to lower roller 100a and upper roller 100b, and rollers 220a and 220b. As discussed above, the compression assembly asserts a crushing pressure to the crop materials, resulting in a crushed crop material. Once the crop material is crushed 402, the crop material is baled 404 via a bale chamber (e.g., bale chamber 19 as shown in FIG. 1 or bale chamber 250 as shown in FIG. 3).

Optionally, during the operation of the baling as shown in FIG. 4, two or more components of the baler may be synchronized 406. For example, the pick-up assembly, the compression assembly and the bale chamber may be synchronized 406 such that operation of the baler is performed smoothly without any clogging or congestion of crop material.

Figure 5:
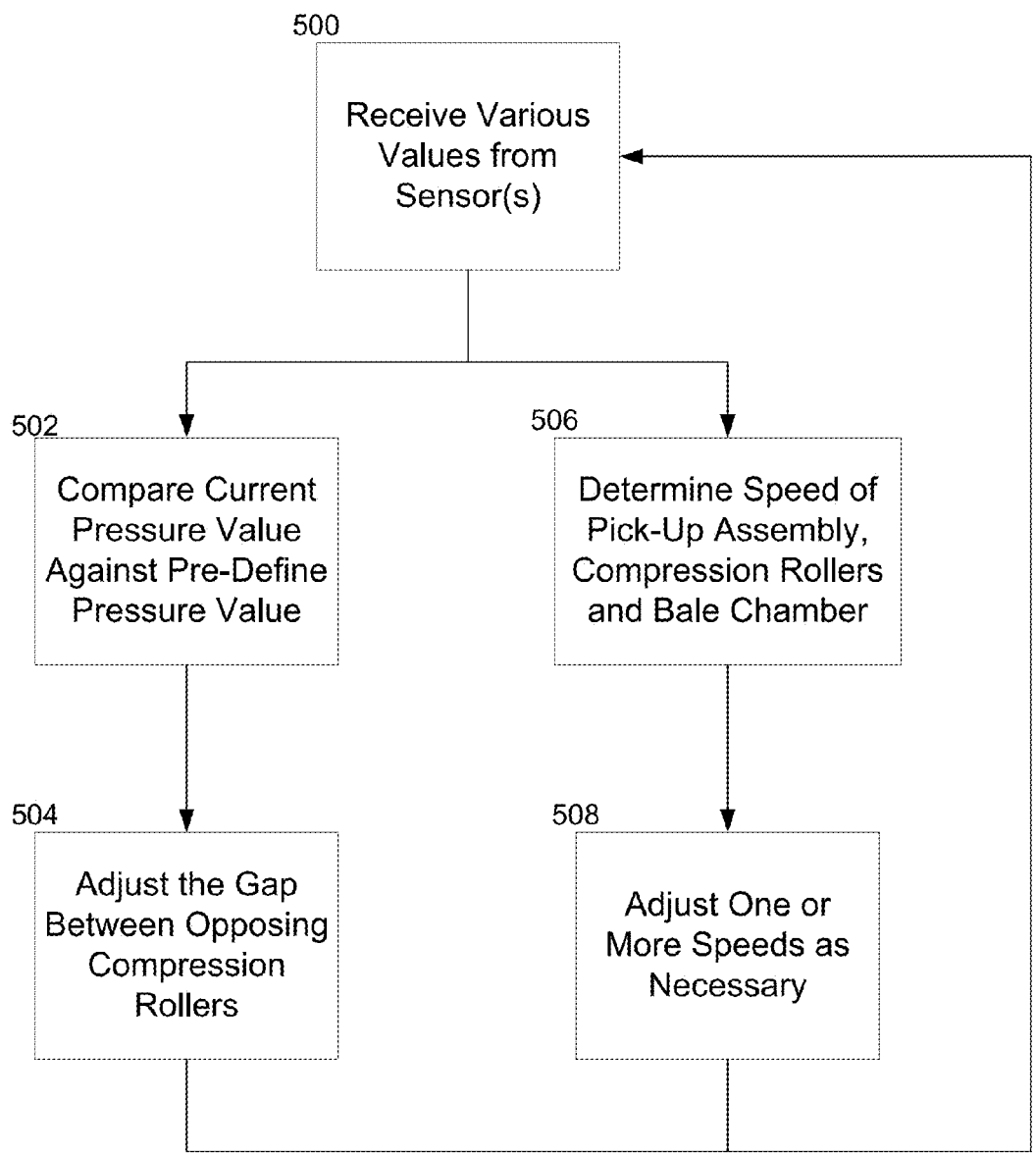
FIG. 5 illustrates an exemplary process for obtaining sensor readings and adjusting the performance of a baler according to an embodiment.

FIG. 5 illustrates an exemplary process for utilizing one or more sensors to optimize high density bale formation as well as the overall performance of a baler. In the example shown in FIG. 5, both a pressure sensor (e.g., pressure sensor 110 as shown in FIG. 1) and a speed sensor (e.g., speed sensor 125 as shown in FIG. 2) are used. However, it should be noted that this is shown for exemplary purposes only. Only one of the sensors may be used, or additional sensors may be added depending on the manufacture and intended use of the baler.

Initially, one or more controllers (e.g., controller 115 as shown in FIG. 1 and/or controller 130 as shown in FIG. 2) receives 500 various input values from the sensors. The controller may compare 502 the current pressure value received 500 from a pressure sensor against the pre-defined pressure value. As discussed above, the pre-defined pressure value may be based upon the type of crop material being baled as well as the desired density of the bales being formed. Based upon the comparison 502, the controller may adjust 504 the gap between the opposing compression rollers by sending a signal to a hydraulic cylinder linking the two rollers to either increase or decrease the gap. Alternatively, the gap may be manually adjusted by an operator of the baler to maintain the current pressure value as close to the pre-defined pressure value as possible.

Similarly, the controller (or a second controller) may determine 506 the speed of various components of the baler based upon the values received 500 from the sensors. For example, the controller may determine 506 the speed of the pick-up assembly, the compression rollers and the bale chamber. The controller may then adjust 508 the speed of one or more of the components in order to synchronize the components, thereby optimizing the throughput of the baler. Alternatively, the speed of the components by be manually adjusted by an operator of the baler.

After either adjustment 504, 508, the controller may receive 500 additional values from the sensor(s) and continue the process illustrated in FIG. 5 until operation of the baler is completed. It should be noted that the pressure and speed adjustment paths are shown in parallel for exemplary purposes only. The adjustments may occur simultaneously as shown in FIG. 5, sequentially one after the other, or according to a set pattern. For example, the pressure exerted by the compression rollers may be determined and adjusted once a minute while the speed of the individual components is monitored and adjusted every 15 seconds.

Figure 6:
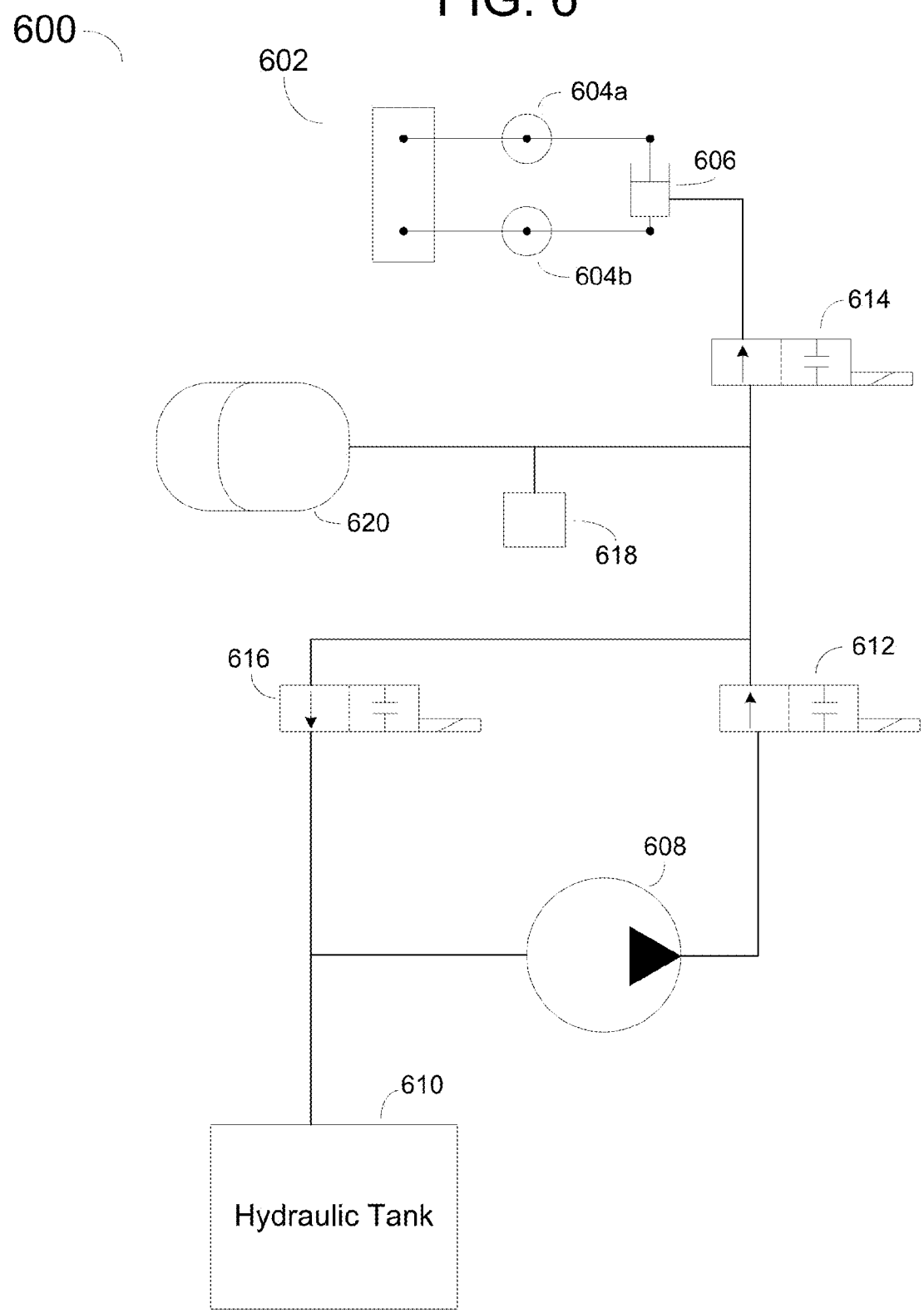
FIG. 6 illustrates an exemplary single acting hydraulic pressure control system according to an embodiment.

FIG. 6 illustrates an exemplary single action hydraulic pressure control system 600 for use with a set of compression rollers. The system 600 may include at least one compression roller assembly 602. The compression roller assembly may include a pair of compression rollers 604a and 604b as well as a hydraulic cylinder 606. A pump 608 may pump hydraulic fluid from a hydraulic tank 610 to the hydraulic cylinder 606 via one or more valves. For example, the pump 606 may pump hydraulic fluid through a pressure increase valve 612 and an isolation valve 614. The isolation valve 614 may be included to isolate the compression roller assembly 602 from any other components on the hydraulic system 600. The hydraulic system may also include a pressure release valve 616 for return of pressurized hydraulic fluid to the hydraulic tank 610.

Depending on the construction and manufacture of the baler, the hydraulic system may also include a pressure sensor 618 and a hydraulic accumulator 620. The hydraulic accumulator 620 may be positioned and configured to reduce pressure variation in hydraulic pressure in the hydraulic system 600 as the hydraulic cylinder 606 moves. Under demand, i.e., during operation of the baler, the hydraulic cylinder 606 may move as the crop mat thickness changes, thereby causing potential pressure variations in the hydraulic system 600. The Hydraulic accumulator 620 may act as a pressure reservoir to reduce these pressure variations. The pressure sensor 618 may be operably connected to a baler monitoring and/or control system for monitoring the pressure in the hydraulic system 600.

Figure 7:
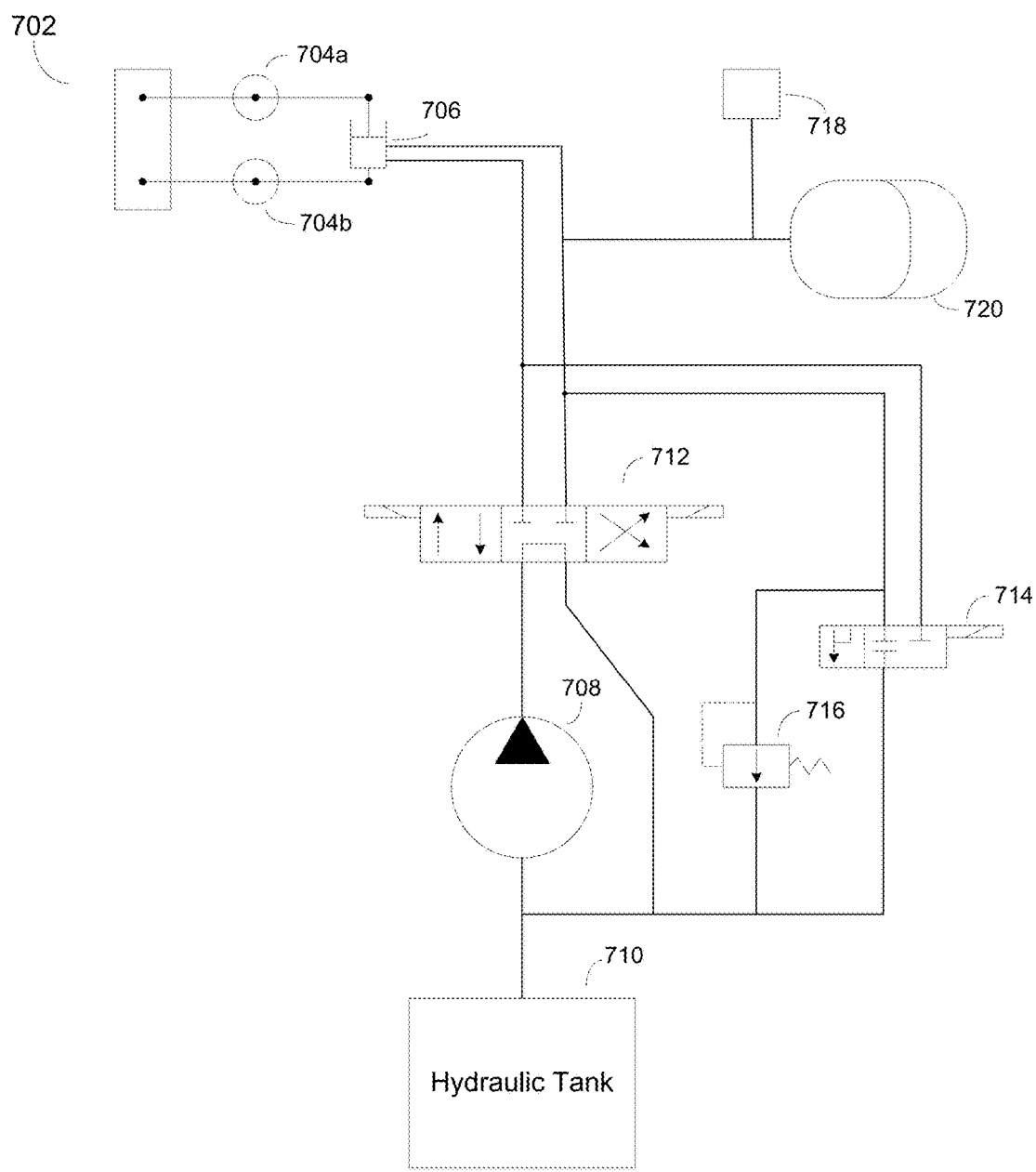
FIG. 7 illustrates an exemplary double acting hydraulic pressure control system according to an embodiment.

FIG. 7 illustrates an exemplary double action hydraulic pressure control system 700 for use with a set of compression rollers. The system 700 may include at least one compression roller assembly 702. The compression roller assembly may include a pair of compression rollers 704a and 704b as well as a hydraulic cylinder 706. A pump 708 may pump hydraulic fluid from a hydraulic tank 710 to the hydraulic cylinder 706 via one or more valves. For example, the pump 706 may pump hydraulic fluid through a double action pressure valve 712. The double action pressure valve 712 may be configured to operate as both a pressure increase valve and a pressure decrease valve. A two-port unloading valve 714 may be included to provide a manual means for removing any pressurized hydraulic fluid from the hydraulic system 700.

Hydraulic system 700 may further include a pressure relief valve 716. The pressure relief valve 716 may be configured to reduce the pressure exerted by the compression rollers 704a and 704b if a foreign object is fed into the baler with the crop material. For example, if a rock is fed into the baler and passed between the compression rollers 704a and 704b, the relief valve 716 may release the pressure on the compression rollers rather than damage the rollers trying to crush the rock.

Depending on the construction and manufacture of the baler, the hydraulic system may also include a pressure sensor 718 and a hydraulic accumulator 720. The hydraulic accumulator 720 may be positioned and configured to reduce pressure variation in hydraulic pressure in the hydraulic system 700 as the hydraulic cylinder 706 moves. Under demand, i.e., during operation of the baler, the hydraulic cylinder 706 may move as the crop mat thickness changes, thereby causing potential pressure variations in the hydraulic system 700. The Hydraulic accumulator 720 may act as a pressure reservoir to reduce these pressure variations. The pressure sensor 718 may be operably connected to a baler monitoring and/or control system for monitoring the pressure in the hydraulic system 700.

Figure 8A:
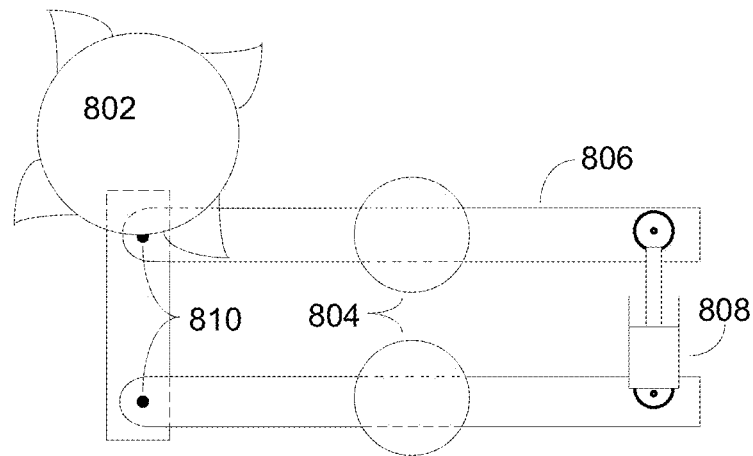
FIGS. 8a-c illustrate various mounting systems and arrangements for compression rollers according to an embodiment.
Figure 8B:
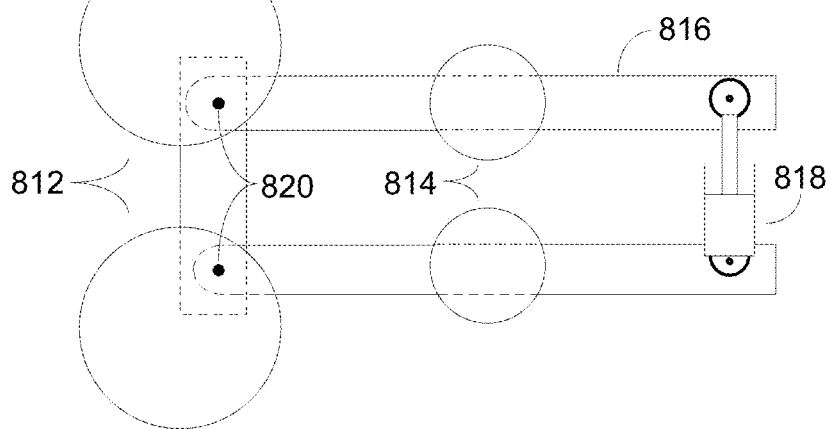
Figure 8C:
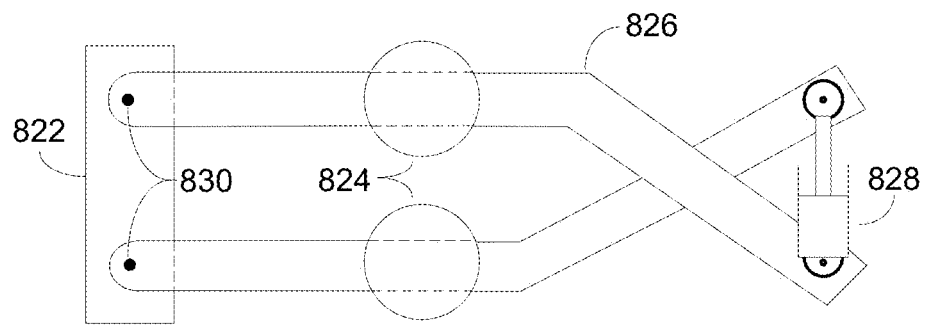

FIGS. 8a-c illustrates various mounting configurations for the compression rollers. FIG. 8a illustrates an exemplary mounting configuration for use with a rotary feeder 802. The pair of compression rollers 804 may be mounted on a steel frame 806. Two or more pivot points or pin joints 810 may be included to allow various components of the steel frame to pivot, thus allowing the compression rollers 804 to move forward or away from each other. The pressure exerted on crop material by the compression rollers 804 may be determined by a hydraulic pressure cylinder 808 in combination with the thickness of the crop material being crushed. The hydraulic cylinder 808 may extend and contract accordingly, depending upon the thickness and density of the crop material, to maintain a constant crushing force. For example, if the thickness of the crop material increases, the hydraulic pressure at a rod end of the hydraulic cylinder 808 may also increase, thereby extending the hydraulic cylinder and moving the compression rollers further apart, thereby maintaining a constant crushing force exerted on the crop material. Conversely, if the thickness of the crop material decreases, the hydraulic pressure at the rod end of the hydraulic cylinder 808 may also decrease, thereby contracting the hydraulic cylinder and moving the compression rollers 804 closer together.

FIG. 8b illustrates a similar configuration as FIG. 8a. A pair of converging rollers 812 may feed crop material to a pair of compression rollers 814. The pair of compression rollers 814 may be mounted on a steel frame 816. Two or more pivot points or pin joints 820 may be included to allow various components of the steel frame to pivot, thus allowing the compression rollers 814 to move forward or away from each other. Like in FIG. 8a, the pressure exerted on crop material by the compression rollers 814 may be determined by a hydraulic pressure cylinder 818 in combination with the thickness of the crop material being crushed. The hydraulic cylinder 818 may extend and contract accordingly, depending upon the thickness and density of the crop material, to maintain a constant crushing force. For example, if the thickness of the crop material increases, the hydraulic pressure at a rod end of the hydraulic cylinder 818 may also increase, thereby extending the hydraulic cylinder and moving the compression rollers further apart, thereby maintaining a constant crushing force exerted on the crop material. Conversely, if the thickness of the crop material decreases, the hydraulic pressure at the rod end of the hydraulic cylinder 818 may also decrease, thereby contracting the hydraulic cylinder and moving the compression rollers 814 closer together.

FIG. 8c illustrates an alternative arrangement. The compression rollers 824 may be mounted on an X-shaped steel frame 826 having two crossing arms. Each arm may be pivotably attached to cross-member 822. Two or more pivot points or pin joints 830 may be included to allow various components of the steel frame to pivot, thus allowing the compression rollers 824 to move forward or away from each other. Like in FIGS. 8a and 8b, the pressure exerted on crop material by the compression rollers 824 may be determined by a hydraulic pressure cylinder 828 in combination with the thickness of the crop material being crushed. The hydraulic cylinder 828 may extend and contract accordingly, depending upon the thickness and density of the crop material, to maintain a constant crushing force. However, in FIG. 8c, the X-shape of the steel frame 826 results in inverted motion related to the extension and contraction of the hydraulic cylinder. For example, if the thickness of the crop material increases, the hydraulic pressure at a rod end of the hydraulic cylinder 828 may decrease, thereby contracting the hydraulic cylinder and moving the compression rollers further apart, thereby maintaining a constant crushing force exerted on the crop material. Conversely, if the thickness of the crop material decreases, the hydraulic pressure at the rod end of the hydraulic cylinder 828 may increase, thereby extending the hydraulic cylinder and moving the compression rollers 824 closer together.

Figure 9:
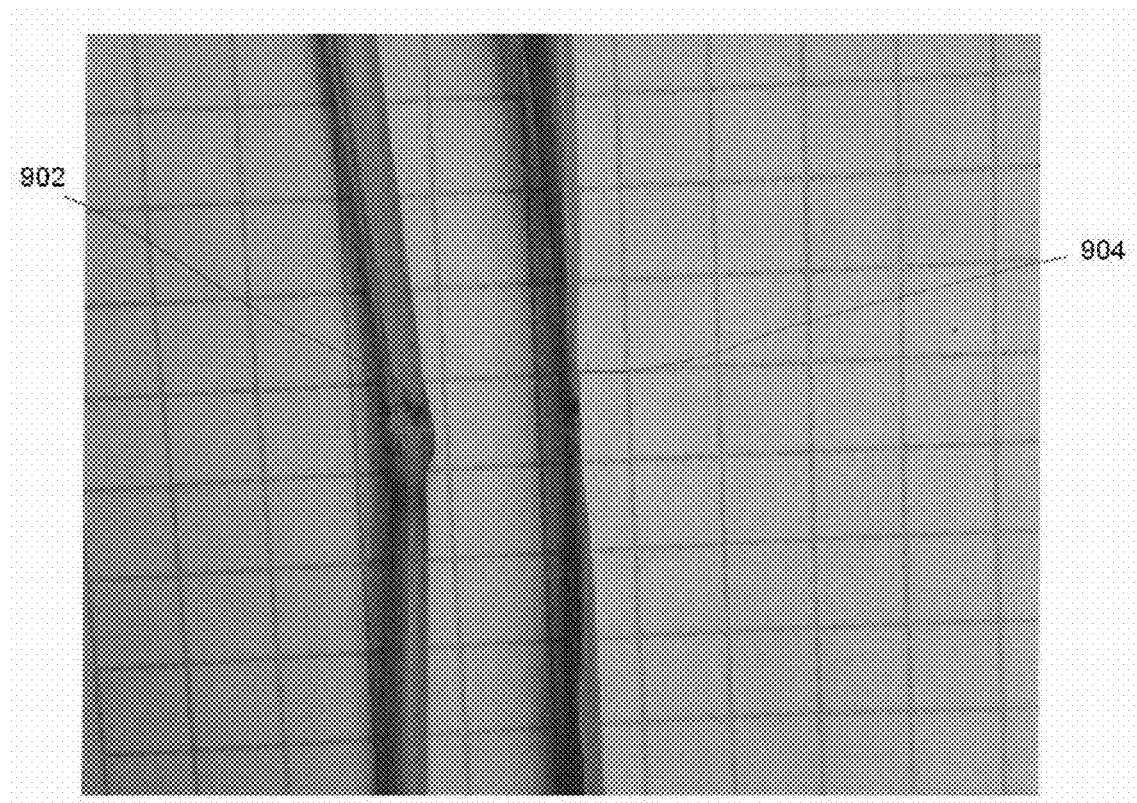
FIG. 9 illustrates an exemplary comparison of crop material pieces according to an embodiment.

FIG. 9 illustrates an exemplary view of two pieces of crop material. Crop material piece 902 has not been crushed and thus has an intact node. Crop material piece 904 has been crushed via a pair of compression rollers. The node of piece 904 has been crushed. By crushing the nodes of the crop material (such as piece 904), the crop material may be more densely baled, resulting in more crop material per bale and thus more efficient collection and transportation of the crop material.

In another embodiment (not shown), two or more sets of opposing compression rollers may be used in series.

Formation of higher density bales is advantageous in the handling and transportation of bales. Formation of higher density bales is also advantageous to support the growing biomass industry.

Although the invention has been described with reference to exemplary embodiments, it is not limited thereto. For example, two pairs of opposing compression rollers can be employed to ensure completely crush crop materials. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A baler comprising:
a pick-up assembly configured to pick up crop material;
a compression assembly supported by a frame of the baler, the assembly located prior to art inlet to a bale chamber or pre-chamber and positioned upstream of the pick-up assembly for receiving the crop material from the pick-up assembly, the compression assembly comprising at least one pair of opposing compression rollers configured to generate a pressure on the crop material passed therethrough, the at least one pair of opposing compression rollers defining an adjustable gap between an upper crop engaging surface of a lower one of the at least one pair of compression rollers and a lower crop engaging surface of an upper one of the at least one pair of compression rollers, the compression assembly being configured to crush and generally flatten the crop material passed through the gap, wherein the pressure on the crop material defines an amount by which the crop material is crushed to decrease the structural integrity of the crop material;
the bale chamber, configured to receive the crushed crop material from the compression assembly and form a bale comprised of the crushed crop; and
a controller and at least one sensor providing an input to the controller, wherein the controller is configured to automatically adjust the position of least one of the at least one pair of compressions rollers changing the size of the gap using an actuator wherein the controller adjusts the actuator based on at least the sensor input and the type of crop material such that a crushing pressure is maintained on crop passing through the gap.

2. The baler of claim 1, wherein to crush comprises destroying the structural integrity of an individual stem of crop material so that the individual stem may not spring back.

3. The baler of claim 2, wherein to crush further comprises flattening a majority of one or more nodes or internodes so that the nodes or internodes do not spring back, wherein the nodes and internodes are located along the stems of the crop material, wherein a majority of the crushed and flattened crop material enters into the chamber or pre-chamber and is still in a flattened state.

4. The baler of claim 3, wherein the majority is a number of nodes or internodes greater than about seventy percent of the nodes and internodes in the crop material.

5. The baler of claim 1, wherein the opposing compression rollers are configured to generate a pressure on the crop material greater than about fifty pound/linear square inch.

6. The baler of claim 1, wherein the opposing compression rollers are configured to generate a pressure on the crop material based on the type of crop material being crushed.

7. The baler of claim 6, wherein the crop material comprises at least one of:
miscanthus, switchgrass, small grain straws, corn cobs, or stover.

8. The baler of claim 1, wherein the opposing compression rollers are configured to generate a pressure on the crop material based on the amount of crop material being crushed.

9. The baler of claim 1, wherein the input is representative of a pressure generated on the crop material by the at least one pair of opposing compression rollers.

10. The baler of claim 1, wherein the compression rollers comprise a saw tooth pattern to improve passage of the crop mater through the baler in addition to crushing the crop material passed therethrough the at least one pair of opposing compression rollers.

11. A method of crushing a crop material to form a high density bale, comprising:
picking up crop material by a pick-up assembly;
crushing the crop material by a compression assembly, the compression assembly positioned upstream of the pick-up assembly for receiving the crop material from the pick-up assembly and adjacent an inlet to a bale chamber or pre-chamber, wherein the compression assembly comprises at least one pair of opposing compression rollers configured to generate a pressure on crop material passed therethrough, the at least one pair of opposing compression rollers defining an adjustable gap between an upper crop engaging surface of a lower one of the at least one pair of compression rollers and a lower crop engaging surface of an upper one of the at least one pair of compression rollers, the compression assembly being configured to crush the crop material passed through the gap, wherein the pressure on the crop material defines an amount by which the crop material is crushed to decrease the structural integrity of and generally flatten a majority of the nodes of the crop material;
sensing a pressure generated while crushing the crop material;
automatically adjusting the adjustable gap using a controller based on the sensed pressure and a type of crop material to be crushed such that a crushing pressure is generally maintained on the majority of nodes of the crop passing through the gap; and
baling the flattened crushed crop material by a bale chamber to form a bale comprised of the crushed crop material, the bale chamber configured to receive the crushed crop material from the compression assembly.

12. The method of claim 11, wherein crushing comprises destroying the structural integrity of an individual stem of crop material so that the individual stem may not spring back.

13. The method of claim 12, wherein crushing further comprises flattening a majority of nodes or internodes so that the nodes or internodes do not spring back and wherein the nodes and internodes are located along the stems of the crop material.

14. The method of claim 11, further comprising configuring the at least one pair of opposing compression rollers to generate a pressure greater than about fifty pound/linear square inch on the crop material.

15. The method of claim 11, further comprising:
adjusting, by a controller, the gap between the at least one pair of opposing compression rollers of the compression assembly to vary the pressure generated by the at least one pair of opposing compression rollers on the crop material passed therethrough.

16. The method of claim 15, further comprising adjusting the gap to vary the pressure based on the type of crop material being crushed.

17. The method of claim 15, further comprising adjusting the gap to vary the pressure based on the amount of crop material being crushed.

18. The method of claim 11, further comprising feeding the crop material with a saw tooth on the compression rollers to improve passage of the crop material through the baler in addition to crushing the crop material passed therethrough.

* * * * *